United States Patent [19]

Brown

[11] Patent Number: 5,568,350

[45] Date of Patent: Oct. 22, 1996

[54] OVER TEMPERATURE MEMORY CIRCUIT

[75] Inventor: Alan E. Brown, Georgetown, Tex.

[73] Assignee: Dell USA, L.P., Austin, Tex.

[21] Appl. No.: 371,235

[22] Filed: Jan. 11, 1995

[51] Int. Cl.$^6$ ............................................. H02H 5/04
[52] U.S. Cl. .................................. 361/104; 361/115
[58] Field of Search ................................ 361/104, 103, 361/106, 115, 56, 58; 337/5, 6, 143, 144; 324/110

[56] References Cited

U.S. PATENT DOCUMENTS

| 3,828,289 | 8/1974 | Hickling | 337/5 |
| 5,140,258 | 8/1992 | Bishop | 324/110 |

*Primary Examiner*—Jeffrey A. Gaffin
*Assistant Examiner*—S. Jackson
*Attorney, Agent, or Firm*—Henry N. Garrana; Mark P. Kahler; Michelle M. Turner

[57] ABSTRACT

A fusible link provided in a power supply of a computer system for providing evidence of an over temperature condition to document a fan failure in the event of catastrophic failure of the power supply. The power supply typically includes a temperature detection circuit often including a thermistor providing a signal indicative of an over temperature condition in the power supply. A latch circuit coupled to the temperature detection circuit shuts the power supply down in an attempt to prevent such catastrophic failure. In a circuit according to the present invention, a fuse is coupled to the temperature detection circuit where the fuse open-circuits when an over temperature condition is detected. Such blown fuse documents the over temperature condition. An external pin provided through a Zener diode and coupled to the fusible link enables external determination of the state of the fuse without disassembling the power supply. In particular, a current source and voltmeter is connected to the external pin, where the current source injects current and the voltmeter measures the voltage indicative of the state of the fuse. In this manner, the present invention provides documentation of an over temperature condition existing prior to failure of a power supply, which typically indicates malfunctioning of the cooling fan.

20 Claims, 1 Drawing Sheet

OVER TEMPERATURE MEMORY CIRCUIT

FIELD OF THE INVENTION

The present invention relates to power supplies for computer systems, and more particularly, to documenting an over temperature condition indicating a failure of the cooling fan.

DESCRIPTION OF THE RELATED ART

The power supply of a computer system typically converts AC power from a wall outlet to the appropriate DC voltage levels required by the computer system. The power supply typically generates a significant amount of heat so that a cooling fan is provided to remove the heat to prevent thermal build up. Should the power supply fail due to thermal buildup, it typically fails in a catastrophic manner thereby destroying substantial evidence which could otherwise identify the mechanism within the power supply that caused the failure. Such evidence is desired for identifying the manufacturer of the failed part for warranty purposes. It is known that the cooling fan is usually the cause of such catastrophic failure since the fan is the least reliable part.

Power supplies typically include a temperature sensing device such as a thermistor to detect over temperature conditions. Power supplies also typically include a latch circuit connected to the temperature sensing device to shut down the power supply in the event the over temperature condition is detected. However, such latch circuitry resets after the system is cooled and the over temperature condition is removed, thereby allowing continued use of the power supply. Such continued use of the power supply with a malfunctioning fan could lead to the failure.

Since power supplies are often warranted for substantial periods of time, sometimes up to three years, it is desirable to identify the part or system of the power supply causing the failure. Presently, there is no system or method for determining the cause of the failure of a power supply after catastrophic failure other than by visual inspection. It is particularly desirable to document an over temperature condition since such condition generally indicates a fan failure.

SUMMARY OF THE INVENTION

In a power supply according the present invention, a low current, normally closed fuse is positioned to open-circuit when the temperature sensing circuit detects an over temperature condition. In particular, a switch receives an over temperature signal provided from the temperature sensor circuit in the event the internal ambient temperature rises above a predetermined level. The switch applies a power voltage across the fuse, causing the fuse to blow or otherwise open-circuit. The open-circuited fuse documents the over temperature condition.

A system according to the present invention also preferably includes a circuit for externally detecting the condition of the fuse without having to disassemble the power supply. An external pin is connected through a Zener diode to the fuse so that an external test circuit may apply a small current source on the external pin to detect the condition of the fuse. In particular, if the DC voltage on the external pin exceeds the nominal voltage of the Zener diode, it is determined that the fuse has been opened so that the over temperature condition was detected. The nominal voltage of the Zener diode is selected to be high enough to not affect the circuitry normally connected to the pin, so that normal operation is not changed. The external pin is preferably the thermal fan speed control (TFSC) node, which is typically used by external circuitry to adjust the speed of the fan, if desired. If the TFSC node is used, the Zener diode and fuse have no affect on the fan speed control functions during operation.

In this manner, a power supply including a fusible link according to the present invention documents the occurrence of an over temperature event prior to catastrophic failure of the power supply. This information is useful for determining warranty responsibilities in identifying failed parts, such as cooling fans.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
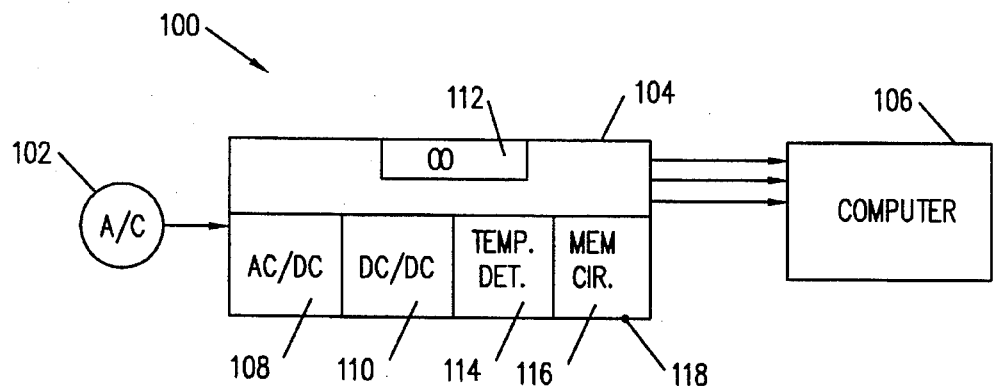
FIG. 1 is a block diagram of a computer system including a power supply implemented according to the present invention.

Referring now to FIG. 1, a computer system 100 is shown including a power supply 104 implemented according to the present invention. An AC source 102 is connected to the input of the power supply 104, which converts AC line voltage to the several DC voltage levels required by a computer 106. The power supply 104 typically includes an AC/DC converter 108 for converting the AC voltage from the AC source 102 to a relatively unregulated DC voltage level, which is provided to the input of a DC/DC converter 110. The DC/DC converter 110 converts the unregulated DC voltage to the plurality of regulated DC signals required by the computer 106. The computer 106 is typically a desktop or server type computer system requiring a significant amount of power. Therefore, the conversion of power within a power supply 104 typically generates a significant amount of heat which must be removed from the power supply 104 to prevent thermal buildup. For this reason, a fan 112 is typically included within the power supply 104 to remove heat and otherwise prevent thermal buildup within the power supply 104. Such thermal buildup is likely to cause catastrophic failure of one or more components, which could destroy the power supply 104.

It is known that the fan 112 is typically the weak link of the power supply 104 and could potentially malfunction. The power supply 104 preferably includes a temperature detection circuit 114 for monitoring the ambient temperature within the power supply 104 to detect thermal buildup or an over temperature condition. The temperature detection circuitry 114 generally includes a latch circuit for shutting down the power supply 104, and thus the computer 106 in the event of thermal buildup or the over temperature condition should the fan 112 malfunction. Nonetheless, once the power supply 104 is off for a period of time, the temperature drops to room temperature and the latch circuitry turns off allowing continued operation. Therefore, although the temperature detection circuitry 114 is intended to prevent catastrophic failure of the power supply 104, continued use and operation over time with a malfunctioning fan 112 could lead to catastrophic failure of the power supply 104. Generally, such catastrophic failure destroys much of a power supply so that it may be difficult to determine the cause of the failure. For this reason, an over temperature memory circuit 116 according to the present invention is provided within the power supply 104 for documenting the over temperature condition. As will be described more fully below, an external fan control pin 118 on the power supply 104 is further used for monitoring the status of the over temperature memory circuit 116 for determining whether the over temperature condition occurred or not.

Figure 2:
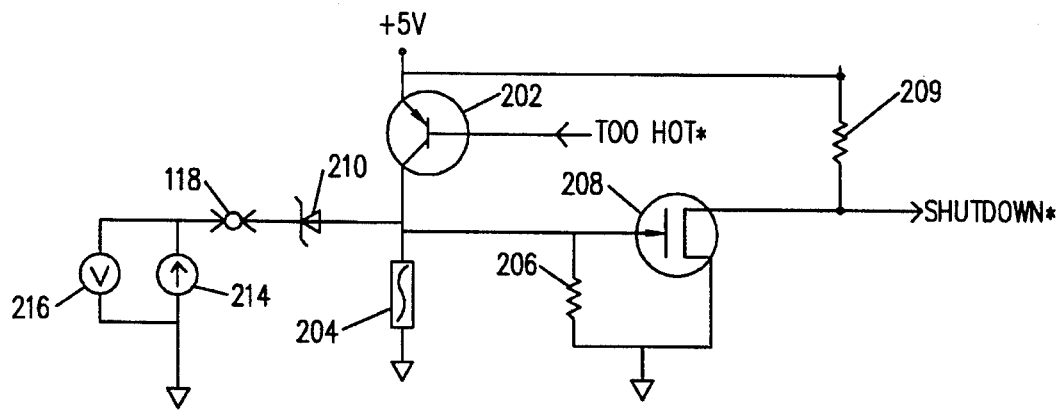
FIG. 2 is a schematic diagram of an over temperature memory circuit according to the present invention.

Referring now to FIG. 2, a simplified schematic diagram is shown of one embodiment of the over temperature memory circuit 114 according to the present invention, referred to as the memory circuit 200. A 5 volt power signal generated by the power supply 104, referred to as the +5 V signal, is provided to the emitter of a PNP bipolar transistor 202 having its collector connected to one end of a fuse 204. The other end of the fuse 204 is connected to ground, which is preferably chassis ground. The base of the transistor 202 receives a signal TOO HOT*, which is normally high but is asserted low when the temperature detection circuit 114 detects an over temperature condition. Signal names generally conform to positive logic where the signal is considered asserted when high and negated when low. However, an asterisk following a signal name denotes negative logic where the signal is considered negated when high and asserted when low. The collector of the transistor 202 is also connected to one end of a resistor 206 and to the gate of an n-channel field-effect transistor (FET) 208. The source of the FET 208 is connected to ground and its drain provides a signal SHUT DOWN*. The drain is also connected to an end of a pull up resistor 209 having its other end connected to +5 V.

The collector of the transistor 202 is also connected to the anode of a Zener diode 210, having its cathode connected to the external pin 118. External pin 118 is preferably a thermal fan speed control (TFSC) node, which is typically pin 19 of standard 145, 224 and 230 watt power supplies by Dell Computer Corporation. The TFSC node is generally connected in a wired-OR fashion to allow external circuitry to override the fan speed control to increase the speed of the fan 112 if desired. The Zener diode 210 of the memory circuit 200 has no effect on the normal operation of the TFSC node, where the TFSC node is used for convenience.

During normal operation, the TOO HOT* signal is negated high so that the transistor 202 is turned off. The gate of the FET 208 is thus pulled to ground through the resistor 206, thereby turning the FET 208 off so that the SHUT DOWN* signal is pulled high through the resistor 209. When an over temperature condition is detected, the TOO HOT* signal is asserted low, thereby activating the transistor 202, effectively placing the +5 V power signal across the fuse 204. The fuse 204 is preferably a very low current "pico" type fuse which effectively blows or opens circuits after the transistor 202 is activated. The +5 V signal is also placed across the resistor 206 raising the gate voltage of the FET 208 high to turn on, which grounds or asserts the SHUT DOWN* signal low indicating a fault condition. The SHUT DOWN* signal is provided to latch circuitry for disabling the power supply 104 to prevent catastrophic failure.

In the over temperature memory circuit 200, the fuse 204 is open-circuited in response to the detection of an over temperature condition, thereby providing evidence that an over temperature condition existed in the event of catastrophic failure. The condition of the fuse 204 is determined by examining it directly or otherwise by detecting its condition through the external pin 118 without disassembling the power supply 104. In particular, an external current source 214 injects current through the Zener diode 210 and a voltmeter coupled to the pin 118 measures the voltage at the cathode of the Zener diode 210. A current of approximately 20 milliamps (ma) is injected through the Zener diode 210 for determining the state of the fuse 204. This current is not enough to blow or open-circuit the fuse 204 normally so that the voltage of the pin 118 will normally not rise above the nominal voltage of the Zener diode 210. Typically, the nominal or reverse breakdown voltage of the Zener diode 210 is chosen above 5 volts and preferably approximately 6.8 volts. The Zener diode 210 effectively isolates the memory circuit 200 from the normal operation of circuitry coupled to the pin 118.

If the fuse 204 has been blown or otherwise open-circuited, the current injected by the current source 214 flows through the resistor 206 causing the voltage at the external pin 118 to rise at or above the nominal voltage of the Zener diode 210. A voltmeter 116 coupled to the test pin 118 is provided for determining the state of the fuse 204. Thus, if the voltage of the test pin 118 is substantially below 5 volts, then the fuse 204 has not been open-circuited. However, if the voltage of the test pin 118 rises at or above 6.8 volts due to the current injected by the current source 214, then it is determined that the fuse 204 has been blown or open-circuited. This provides explicit evidence that an over temperature condition existed prior to catastrophic failure without disassembling the power supply 104.

Figure 3:
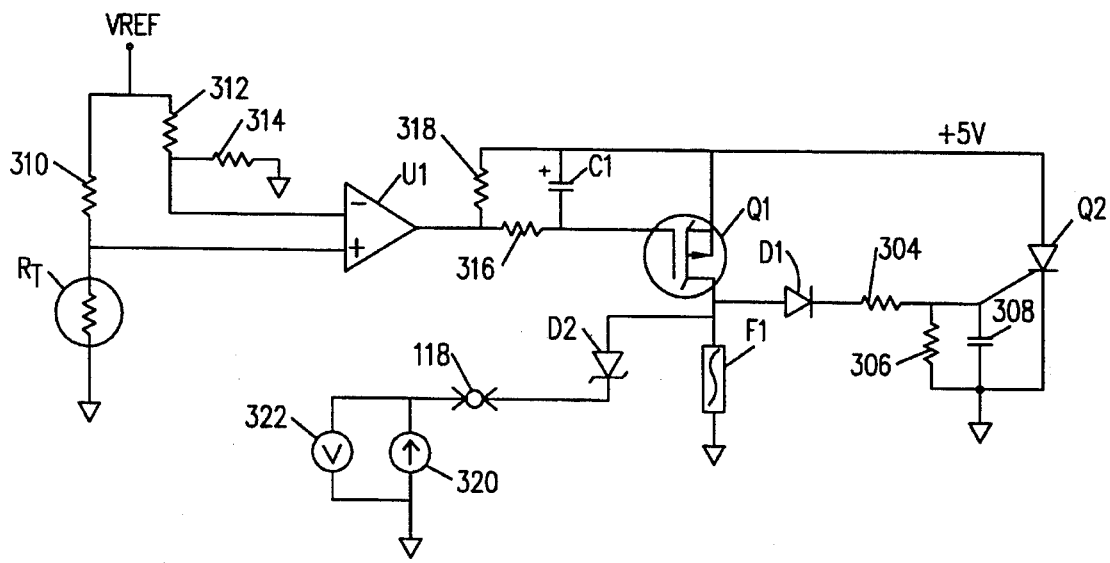
FIG. 3 is a schematic diagram of a detection and memory circuit according to the present invention.

Referring now to FIG. 3, a more detailed schematic diagram is shown of a thermal detection and memory circuit 300 according to the present invention, which could be used in the power supply 104. As will be described below, the detection and memory circuit 300 also includes portions of the temperature detection circuit 114. The +5 V signal is provided to the source of a p-channel metal oxide semiconductor FET (MOSFET) Q1, having its drain connected to one end of a fuse F1, the anode of a Zener diode D2 and to the anode of a diode D1. The cathode of the Zener diode D2 is connected to the external pin 118, which again is preferably the TFSC node. Again, the Zener diode D2 has a nominal voltage above 5 volts, or preferably about 6.8 volts. The other end of the fuse F1 is connected to ground and the cathode of the diode D1 is connected to one end of a resistor 304, having its other end connected to the gate of a silicon controlled rectifier (SCR) Q2. The anode of SCR Q2 is connected to the +5 V signal and its cathode is connected to ground. The gate of SCR Q2 is connected to a filter circuit comprising resistor 306 coupled in parallel with a capacitor 308 between the gate of SCR Q2 and ground. The gate of SCR Q2 may also be connected to other fault detecting circuitry for shutting down the power supply 104, as desired.

A reference voltage $V_{REF}$ is provided to one end of a resistor 310 and to one end of another resistor 312. The other end of the resistor 312 is connected to one end of a resistor 314, having its other end connected to ground. The other end of the resistor 310 is connected to one end of a thermistor $R_T$, which is preferably a negative thermal coefficient (NTC) thermistor having a resistance inversely proportional to its ambient temperature. The other end of the thermistor $R_T$ is connected to ground. The thermistor $R_T$ is preferably positioned to measure the internal temperature of the power supply 104 or is otherwise in good thermal contact with a heat source within the power supply 104. The thermistor $R_T$ therefore provides a measure of the effectiveness of the cooling fan 112. The resistance, of the thermistor $R_T$ decreases as the temperature of the power supply 104 (or thermal source) increases, thereby decreasing the voltage at the junction between the resistor 310 and the thermistor $R_T$.

The junction between the resister 310 and the thermistor $R_T$ is connected to the positive input of a comparator U1, having its negative input connected to the junction between the resistor 312 and the resistor 314. The output of the comparator U1 is connected to one end of a resistor 316 and to one end of a resistor 318, where the other end of the resistor 316 is connected to the gate of the MOSFET Q1 and to one end of a capacitor C1, and where the other end of the resistor 318 is connected to the +5 V signal. The other end of the capacitor C1 is connected to the 5 V signal.

Operation of the thermal detection and memory circuit 300 is as follows. The voltage divider comprising resistors 3 12 and 314 divides the $V_{REF}$ signal to a voltage which is normally less than the voltage across the thermistor $R_T$ during normal operating temperature. The temperature of the power supply 104 is relatively low so that the resistance of the thermistor $R_T$ is high enough to keep the voltage at the positive input of the comparator U1 greater than the voltage provided to its negative input. The comparator U1 thus asserts its output high causing a negligible voltage across the capacitor C1 so that the MOSFET Q1 is shut off. The diode D1 and the resistors 304 and 306 generally clamp the gate of the SCR Q2 low, thereby keeping the SCR Q2 off or open-circuited. Should the internal temperature of the power supply 104 (or the thermal source) begin to increase due to failure of a device such as the cooling fan 112, the resistance of the thermistor $R_T$ drops so that eventually the voltage provided to the positive input of the comparator U1 goes below the voltage provided at its negative input. This causes the output of the comparator U1 to go low causing a current to flow through the capacitor C1. The capacitor C1 eventually charges so that the voltage at the gate of the MOSFET Q1 goes low thereby turning it on and placing the +5 V signal across the fuse F1. The fuse F1 is preferably a very low current pico type fuse, which effectively blows or open-circuits when the +5 V signal is applied across it. Thus, the fuse F1 is open-circuited thereby providing explicit evidence of an over temperature condition of the power supply 104.

The +5 V power signal also forward biases the diode D1 when the MOSFET Q1 is on, thereby providing a high voltage at the gate of the SCR Q2 turning it on. When the SCR Q2 is turned on, the +5 V signal is temporarily grounded causing an error or fault condition of the power supply 104 thereby shutting it down. However, as described previously, the over temperature condition or repeated operation may still cause a catastrophic failure of the power supply 104 in spite of the operation of the latching circuitry surrounding the SCR Q2. After a catastrophic failure occurs, the open-circuited fuse F1 provides evidence that an over temperature condition existed prior to such failure.

The fuse F1 may be visually inspected for determining whether an over temperature condition existed prior to failure. Preferably, however, the state of the fuse F1 is detected by injecting current the Zener diode D2 using an external current source 320 and by measuring the voltage of the pin 118 with an external voltmeter 322, both connected to the external pin 118. The current supplied by the current source 320 is preferably approximately 20 ma which would normally not cause the fuse F1 to open-circuit. If the fuse F1 is not open-circuited, then the current provided by the current source 320 causes the voltage of the pin 118 to remain substantially below 5 volts indicating that an over temperature condition was not detected prior to failure. However, if the fuse F1 has been open-circuited, the voltmeter 322 measures a substantially higher voltage above the nominal voltage of the Zener diode D2, thereby indicating that the fuse F1 has been blown or otherwise open-circuited. In this case, the fuse F1 provides evidence that an over temperature condition existed in the power supply 104 prior to failure. This evidence typically means that the cooling fan 112 of the power supply 104 malfunctioned.

It is therefore appreciated that an over temperature memory circuit according to the present invention provides a method for documenting an over temperature condition in a power to supply prior to catastrophic failure. The memory circuit preferably includes a fuse which blows upon the occurrence of the over temperature condition. The status of the fuse is monitored externally through an external test pin in the preferred embodiment.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A memory circuit for documenting an over temperature condition in a power supply, the power supply including a temperature sensor circuit asserting a signal indicative of an over temperature condition, said memory circuit comprising:

a switch receiving the over temperature condition signal and switching in response thereto for switching a power voltage; and a fuse coupled to said switch for receiving said power voltage wherein said fuse open-circuits in response to said power voltage being applied across it;

wherein the power supply includes an external pin, and:

means coupled to said fuse and for coupling to the external pin for facilitating detection of the status of said fuse; and said status detection means comprises a Zener diode having a predetermined nominal voltage.

2. The memory circuit of claim 1, wherein said switch comprises a transistor.

3. The memory circuit of claim 1, wherein said fuse is a low current fuse.

4. The memory circuit of claim 3, wherein said fuse is a pico type fuse.

5. The memory circuit of claim 1, wherein the over temperature sensor comprises a thermistor.

6. The memory circuit of claim 5, wherein said thermistor has a negative temperature coefficient.

7. A power supply, comprising:

a temperature sensor for measuring the internal temperature of the power supply;

a comparator circuit coupled to said temperature sensor for asserting an over temperature signal if the temperature rises above a predetermined level;

a switch receiving the over temperature signal for asserting a power voltage;

a fuse coupled to said switch, wherein said fuse open-circuits in response to said power voltage being asserted;

an external pin coupled to said fuse for allowing external electrical inspection of said fuse; and a diode coupled between said external pin and said fuse.

8. The power supply of claim 7, wherein said switch comprises a transistor for applying said power voltage across said fuse.

9. The power supply of claim 7, wherein said temperature sensor comprises a thermistor.

10. The power supply of claim 7, wherein said diode is a Zener diode.

11. The power supply of claim 7, further comprising a cooling fan for removing heat from the internal portion of the power supply.

12. The power supply of claim 7, wherein said fuse is a low current fuse.

13. The power supply of claim 11, wherein said fuse is a pico type fuse.

14. A computer system, comprising:

a system bus;

at least one microprocessor subsystem, connected to access said system bus as master;

a plurality of other subsystems, each connected to access said system bus;

a power supply, connected to provide power to said computer system;

a cooling fan for said computer system;

means for monitoring the operation of said cooling fan; said monitoring means comprising:

a temperature sensor means for generating an output signal indicative of an over temperature condition within said computer system;

a fuse; and current limiting means, connected to said power supply and said fuse, for limiting the current flow through said fuse to a sufficiently low level to prevent said fuse from activating under normal operating conditions;

said current limiting means being responsive to said generated output signal for allowing current flow through said fuse to a sufficiently high level to activate said fuse.

15. The computer system of claim 14, wherein the power supply includes an external pin, further comprising:

means coupled to said fuse and for coupling to the external pin for facilitating detection of the status of said fuse.

16. The computer system of claim 14, wherein said current limiting means comprises a transistor.

17. The computer system of claim 14, wherein said fuse is a low current fuse.

18. The computer system of claim 17, wherein said fuse is a pico type fuse.

19. The computer system of claim 14, wherein the temperature sensor comprises a thermistor.

20. The computer system of claim 19, wherein said thermistor has a negative temperature coefficient.

* * * * *